(12) United States Patent
Jang et al.

(10) Patent No.: US 11,728,897 B2
(45) Date of Patent: Aug. 15, 2023

(54) APPARATUS AND METHOD FOR OPTICAL WIRELESS COMMUNICATION BASED ON COLOR M-ARY FREQUENCY SHIFT KEYING

(71) Applicant: Kookmin University Industry Academy Cooperation Foundation, Seoul (KR)

(72) Inventors: Yeong Min Jang, Seoul (KR); Ngoc Huy Nguyen, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 17/549,779

(22) Filed: Dec. 13, 2021

(65) Prior Publication Data
US 2022/0360338 A1 Nov. 10, 2022

(30) Foreign Application Priority Data

May 6, 2021 (KR) .................. 10-2021-0058527
May 20, 2021 (KR) .................. 10-2021-0064815

(51) Int. Cl.
*H04B 10/50* (2013.01)
*H04B 10/556* (2013.01)
(Continued)

(52) U.S. Cl.
CPC ....... *H04B 10/5563* (2013.01); *H04B 10/116* (2013.01); *H04B 10/502* (2013.01);
(Continued)

(58) Field of Classification Search
CPC .................. H04B 10/5563; H04B 10/116; H04B 10/502; H04B 10/11; H04B 10/50;
(Continued)

(56) References Cited

U.S. PATENT DOCUMENTS 9,246,585 B2 * 1/2016 Yokoi ............... H04B 10/1141
10,560,188 B2 * 2/2020 Jang ................. H04B 10/5563
(Continued)

FOREIGN PATENT DOCUMENTS

KR 1020140142646 A 12/2014
KR 101651584 B1 8/2016
(Continued)

OTHER PUBLICATIONS

Chow, et al, "Non-flickering 100 m RGB visible light communication transmission based on a CMOS image sensor," https://doi.org/10.1364/OE.26.007079, revised Jan. 19, 2018; accepted Jan. 22, 2018; published Mar. 8, 2018, 6 Pages.

*Primary Examiner* — Dibson J Sanchez
(74) *Attorney, Agent, or Firm* — Berkeley Law & Technology Group, LLP

(57) ABSTRACT

An optical signal transmission method according to an embodiment of the disclosure is an optical signal transmission method in which a processor performs at least part of each operation, and may include an operation of receiving a data stream, an operation of separating at least part of the data stream into three channels, modulating the separated data streams respectively according to M-ary frequency shift keying (M-FSK) scheme so as to produce an FSK modulated signal, an operation of combining a plurality of FSK modulated signals modulated respectively in the three channels, and producing a color modulated signal according to a bit-color mapping table set in advance, and an operation of transmitting the color modulated signal by controlling a light source of the same optical channel based on the color modulated signal.

12 Claims, 12 Drawing Sheets

(51) Int. Cl.
  *H04L 27/12* (2006.01)
  *H04L 27/10* (2006.01)
  *H04B 10/116* (2013.01)
  *H04B 10/11* (2013.01)

(52) U.S. Cl.
  CPC ............ *H04L 27/106* (2013.01); *H04L 27/12* (2013.01); *H04B 10/11* (2013.01); *H04B 10/50* (2013.01); *H04B 10/556* (2013.01)

(58) Field of Classification Search
  CPC . H04B 10/556; H04B 10/1141; H04L 27/106; H04L 27/12
  USPC .................. 398/118–131, 182–201
  See application file for complete search history.

(56) References Cited

U.S. PATENT DOCUMENTS

| | | | | |
|---|---|---|---|---|
| 2007/0058987 A1* | 3/2007 | Suzuki | ............... | H04B 10/1141 398/183 |
| 2010/0034540 A1* | 2/2010 | Togashi | ................... | H04N 7/22 398/118 |
| 2010/0104277 A1* | 4/2010 | Robinson | ............. | H04B 10/548 398/187 |
| 2011/0044701 A1* | 2/2011 | Schenk | .................. | H05B 47/10 398/183 |
| 2011/0200338 A1* | 8/2011 | Yokoi | .................. | H04B 10/116 398/158 |
| 2012/0224864 A1* | 9/2012 | Walewski | .......... | H04B 10/1141 398/158 |
| 2014/0093126 A1* | 4/2014 | Roberts | .................. | G06V 20/36 382/103 |
| 2014/0093234 A1* | 4/2014 | Roberts | ................ | H04B 10/564 398/79 |
| 2014/0099107 A1* | 4/2014 | Ravich | .................. | H04B 10/116 398/43 |
| 2014/0219663 A1* | 8/2014 | Roberts | ................ | H04B 10/524 398/185 |
| 2014/0241730 A1* | 8/2014 | Jovicic | ................. | H04B 10/116 398/118 |
| 2016/0028478 A1* | 1/2016 | Rietman | ............ | H04B 10/5563 398/118 |
| 2018/0254833 A1* | 9/2018 | Cavaliere | ............. | H04B 10/503 |
| 2018/0262379 A1* | 9/2018 | Roth | ................... | H03M 13/258 |

FOREIGN PATENT DOCUMENTS

| | | |
|---|---|---|
| KR | 101728518 B1 | 4/2017 |
| KR | 101735932 B1 | 5/2017 |
| KR | 1020170084709 A1 | 7/2017 |

* cited by examiner

FIG. 3
| Preamble 1 | Preamble 2 | Payload (bit: 01 01 01) |
FIG. 4
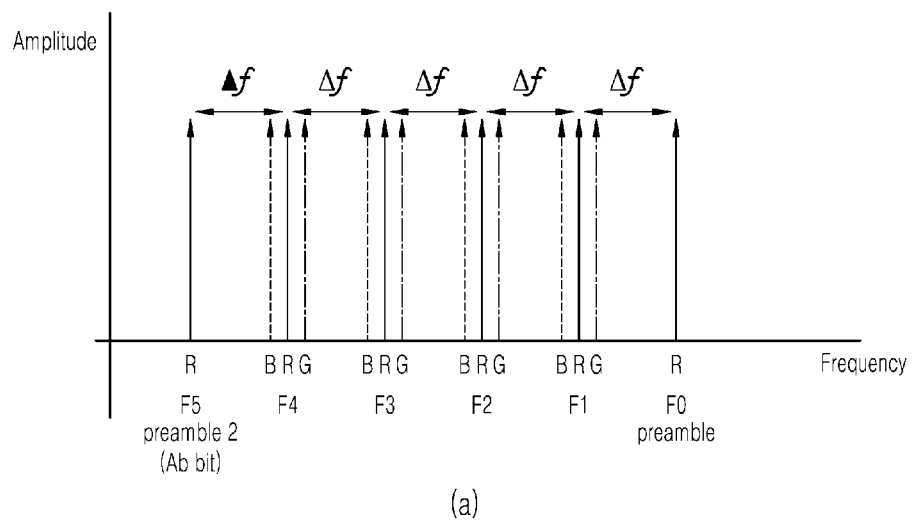
(a)
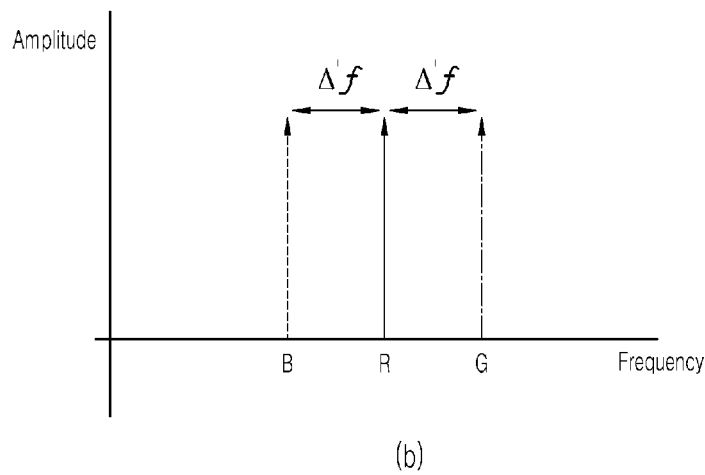
(b)

APPARATUS AND METHOD FOR OPTICAL WIRELESS COMMUNICATION BASED ON COLOR M-ARY FREQUENCY SHIFT KEYING

CROSS-REFERENCE TO RELATED APPLICATION

This present application claims the benefit of priority to Korean Patent Application No. 10-2021-0064815, entitled "APPARATUS AND METHOD FOR OPTICAL WIRELESS COMMUNICATION BASED ON COLOR M-ARY FREQUENCY SHIFT KEYING AND GRAYSCALE IMAGE," filed on May 20, 2021, and No. 10-2021-0058527, entitled "APPARATUS AND METHOD FOR OPTICAL WIRELESS COMMUNICATION BASED ON COLOR M-ARY FREQUENCY SHIFT KEYING," filed on May 6, 2021, in the Korean Intellectual Property Office, the entire disclosure of which is incorporated herein by reference.

BACKGROUND OF THE INVENTION

1. Field of the Invention

The disclosure relates to technology for transmitting a signal via optical wireless communication based on M-ary frequency shift keying (M-FSK).

2. Description of the Prior Art

The disclosure described below is merely to provide background information related to embodiments of the disclosure, and the described contents do not constitute the conventional art.

Research on visible light communication (VLC) technology which is wireless communication technology that adds a communication function to a visible light wave is being actively conducted, thanks to the infrastructure in which lights such as an incandescent light, a fluorescent light, or the like are replaced with a semiconductive light emitting diode (LED) light.

In addition, research on an optical camera communication (OCC) technology which demodulates a visible light communication signal received using a camera mounted in a user device such as a normal smartphone, a vehicle camera, or the like is being conducted.

A camera mounted in a user device may capture a light source according to a global shutter scheme or a rolling shutter scheme.

Korean registered patent No. 10-165184 discloses technology that performs communication using a rolling shutter scheme-based camera according to a camera-based M-FSK scheme. However, a normal M-FSK scheme is capable of using only a single frequency at a single light source at the same time, and thus, there is difficulty in high-speed data transmission.

Korean registered patent No. 10-1728518 discloses technology that performs communication according to a color shift keying (CSK) scheme. However, according to a normal CSK scheme, a reception apparatus has a high error rate due to color recognition which is dependent upon a reception environment, and technology for restoring the error is required separately, which is a drawback. In addition, if the distance to a transmission apparatus is increased, a photo detector-based CSK signal reception apparatus may have difficulty in recognizing a signal due to an ambient light.

STATEMENT REGARDING GOVERNMENT SUPPORT

This invention was supported at least in part by Ministry of Science and IST, the title of which is "Research of Intellectual Internet of Energy (IoE) Data" (Project Number: 1711116158) conducted by KOOKMIN UNIVERSITY Industry Academic Cooperation Foundation.

SUMMARY OF THE INVENTION

An embodiment of the disclosure is to provide a method and apparatus capable of transmitting data in high speed in camera-based visible light communication.

Another embodiment of the disclosure is to provide a method and apparatus capable of transmitting data strongly and in high speed based on M-FSK modulation and CSK modulation via visible light communication technology.

The purpose of the disclosure is not limited to the above-described subject matters, and other purposes and advantages will be understood via the following description, and will be clearly understood by the embodiments of the disclosure. In addition, it will be apparent that the purpose and the advantages of the disclosure will be implemented by ways stated in claims and a combination thereof.

In accordance with an aspect of the disclosure, there is provided an optical signal transmission method in which a processor performs at least part of each operation, the method including receiving a data stream, separating at least part of the data stream into three channels, and modulating the separated data streams according to an M-ary frequency shift keying (M-FSK) scheme so as to produce FSK modulated signals, combining a plurality of FSK modulated signals which are modulated respectively in the three channels, and producing a color modulated signal based on a predetermined bit-color mapping table, and transmitting the color modulated signal by controlling a light source of an identical optical channel based on the color modulated signal. According to an embodiment, the FSK modulated signal may be produced by mapping, to identical bit codes, frequencies different for respective channels.

In accordance with an aspect of the disclosure, there is provided an optical signal transmission apparatus, the apparatus including a light source part including a color LED, a modulator configured to modulate an input signal, and a controller configured to transmit a modulated transmission signal by controlling the light source part, wherein the modulator is configured to receive a data stream, to separate at least part of the data stream into three channels, to respectively modulate the separated data streams according to an M-ary frequency shift keying (M-FSK) scheme so as to produce FSK modulated signals, to combine the plurality of FSK modulated-signals which are modulated respectively in the three channels, and to produce a color modulated signal based on a bit-color mapping table set in advance, and wherein the controller transmits the color modulated signal to a single identical channel by controlling the light source part. According to an embodiment, the modulator is further configured to produce the FSK modulated signals by mapping, to identical bit codes, frequencies different for respective channels.

In accordance with an aspect of the disclosure, there is provided an optical signal reception apparatus, the apparatus including a camera configured to receive an optical signal and to produce an image, at least one processor, and a memory electrically connected to the processor, and to store at least one code implemented in the processor, wherein the memory stores a code that, when executed by the processor, causes the processor to produce an image frame obtained by controlling the camera to capture a light source including a color LED, to produce a color code data signal by demodulating, based on a bit-color mapping table set in advance, color information extracted from an area including the captured light source part in the image frame, to separate at least part of the color code data signal into three channels, to extract a frequency by performing Fourier transform on the separated color code data signal of each channel, and to demodulate, based on a bit-frequency mapping table set in advance and the frequency, the color code data signal of each channel according to M-ary frequency shift keying (M-FSK) scheme, so as to produce a data stream.

In accordance with an aspect of the disclosure, there is provided an optical signal reception apparatus, the apparatus including a camera configured to produce an image by receiving an optical signal, at least one processor, and a memory electrically connected to the processor, and to store at least one code implemented in the processor, wherein the memory stores a code that, when executed by the processor, causes the processor to produce a grayscale image frame based on a sensor signal of the camera obtained by capturing a light source including a color LED, to produce an FSK modulated signal by extracting grayscale level information from an area including the captured light source in the grayscale image frame, to extract a frequency by performing Fourier transform on the FSK modulated signal, and to demodulate, based on a bit-frequency mapping table and the frequency, the FSK modulated signal according to M-ary frequency shift keying (M-FSK) scheme, so as to produce a data stream.

A signal reception apparatus and method according to an embodiment of the disclosure modulates a modulated M-FSK modulated signal to a color signal, and transmits the same, thereby increasing a data transmission speed in visible light communication.

A signal reception apparatus and method according to an embodiment of the disclosure modulates a modulated M-FSK modulated signal to a color signal and transmits the same, thereby decreasing an error rate in visible light communication.

A signal reception apparatus and method according to an embodiment of the disclosure demodulates a light signal modulated based on modulated M-FSK modulation and CSK modulation, by using visible light communication technology with a simple configuration.

The effect of the disclosure is not limited to the above-described effects, and other effects which are not mentioned will be apparently understood by those skilled in the art based on the following description.

BRIEF DESCRIPTION OF THE DRAWINGS

The above and other aspects, features, and advantages of the present disclosure will be more apparent from the following detailed description taken in conjunction with the accompanying drawings, in which:

FIG. 3 is a diagram illustrating an embodiment of a packet of a data stream according to an embodiment of the disclosure;

FIG. 4 is a diagram illustrating a frequency used for M-FSK modulation according to an embodiment of the disclosure;

DETAILED DESCRIPTION OF THE EXEMPLARY EMBODIMENTS

Figure 1:
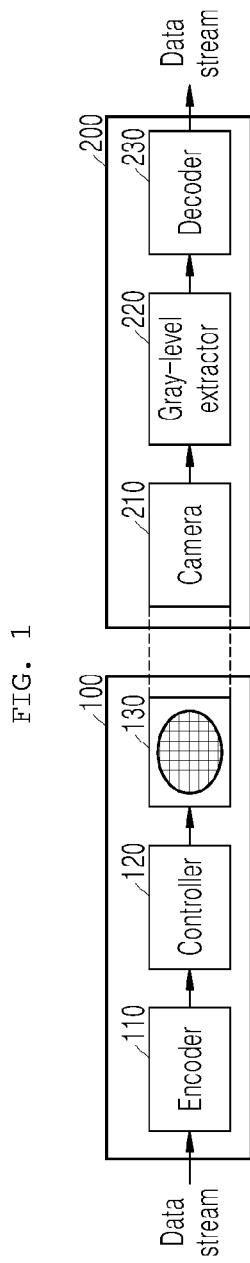
FIG. 1 is a diagram schematically illustrating communication between a signal transmission apparatus and a signal reception apparatus according to an embodiment of the disclosure.

Hereinafter, reference will now be made to example embodiments, which are illustrated in the accompanying drawings, wherein like reference numerals may refer to like components throughout and duplicated description thereof will be omitted. An ending word used for an element, such as "module" and "unit", is assigned or used for ease of drafting the specifications, and may not have a distinguishing meaning or role. In addition, when detailed descriptions related to a well-known related technical art is identified as making the subject matter of the embodiments disclosed in the specification unclear, the detailed descriptions will be omitted herein. In addition, the attached drawings are merely for help a sufficient understanding of embodiments disclosed in the specification, and it should be understood, however, that the technical idea disclosed in the specification is not limited to the attached drawings, but to the contrary, example embodiments are to cover all modifications, equivalents, and alternatives falling within the idea of the disclosure and technical scope thereof.

Terms including an ordinal number such as first, second, and the like may be used for describing various elements, but the elements are not limited to the terms. The terms are used only for the purpose of differentiating one element from other elements.

It will be understood that when an element is "connected" or "coupled" to another element, it may be directly connected or coupled to the other element, or intervening elements may be present therebetween. On the other hand, it will be understood that when an element is "directly connected" to another element or is "directly coupled" to another element, intervening element may not be present.

With reference to FIG. 1, communication between a signal transmission apparatus and a signal reception apparatus according to an embodiment of the disclosure will be described.

Referring to FIG. 1, a signal transmission apparatus 100 may be configured to transmit a transmission signal as a visible light signal via a light source part 130 including a color LED, wherein the transmission signal is a signal obtained by receiving data, modulating the data based on M-FSK, and modulating the modulated data to a color signal.

In a signal reception apparatus 200, a color separator 220 demodulates, based on a bit-color mapping table set in advance, a color signal from an image frame obtained by a camera 210 (a rolling camera or a global camera) by capturing the light source part 130 including a color LED, and separates the color signal for each channel, and a color M-FSK decoder 230 extracts a frequency from a color signal for each channel and demodulates the same based on M-FSK, so as to produce data.

In order to modulate the data according to the M-FSK scheme, the signal transmission apparatus 100 may separate the data into three channels and may modulate data for each channel according to the M-FSK scheme.

The signal transmission apparatus 100 may produce a color modulated signal based on a signal obtained by combining a plurality of FSK modulated signals which are respectively modulated in the three channels. This will be described in detail with reference to FIG. 5.

The signal transmission apparatus 100 may control the light source part 130 including a color LED so as to emit light according to a color modulated signal, so as to transmit the color modulated signal as a visual light signal.

The signal reception apparatus 200 may produce an image frame by capturing a light source of the signal transmission apparatus 100 including a color LED.

The signal reception apparatus 200 may determine a light source area in the image frame, and may extract color information from the image frame of the light source area.

Based on a bit-color mapping table set in advance, the signal reception apparatus 200 may demodulate the extracted color information, so as to produce a color code data signal.

The signal reception apparatus 200 may separate at least part of the color code data signal into three channels, may perform Fourier transform on the separated color code data signal of each channel, may extract a frequency, and, based on the frequency and a bit-frequency mapping table set in advance, demodulate the color code data signal of each channel according to M-FSK scheme, thereby producing a data stream.

Figure 2:
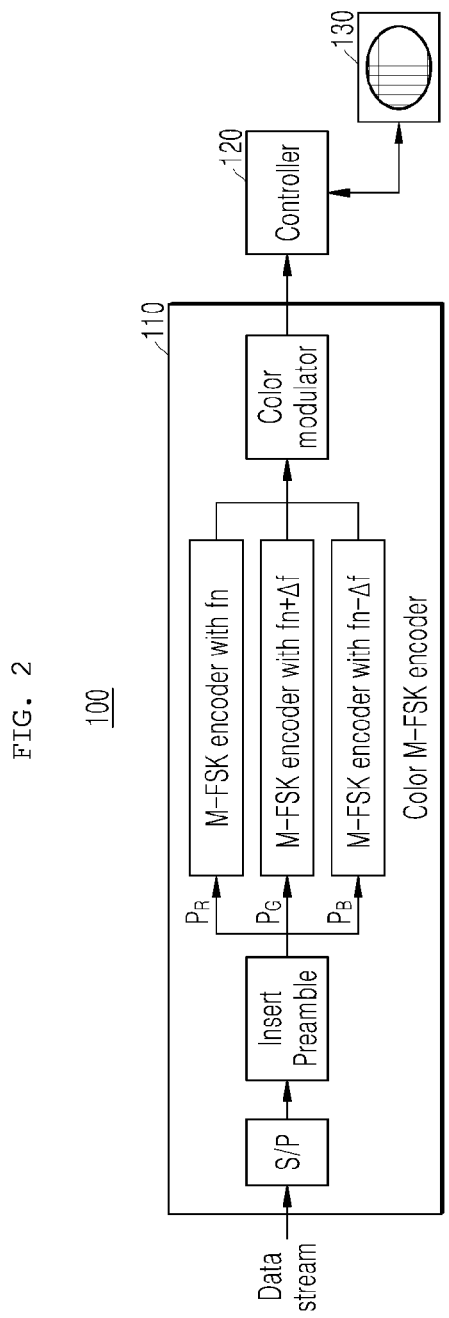
FIG. 2 is a block diagram illustrating the configuration of a signal transmission apparatus according to an embodiment of the disclosure.

With reference to FIG. 2, the configuration of a signal transmission apparatus according to an embodiment of the disclosure will be described.

Referring to FIG. 2, the signal transmission apparatus 100 may include a color M-FSK encoder 110, a serial to parallel (S2P) converter, a preamble inserter, an M-FSK color S2-PSK encoder 110, a modulator including a color modulator, and a controller 120 that controls the light source part 130 which is a communication channel including an LED light source, and may include a clock generator that generates a clock signal.

According to an embodiment, a data stream may be a packet obtained by modulating a signal desired to be transmitted into a binary signal. The modulator may include a forward error correction (FEC) encoder, a preamble inserter, and a binary modulator that modulates input data into a binary signal.

According to an embodiment, the color M-FSK encoder 110 may modulate, into a color code data signal, a data stream in which a binary signal is configured in the form of a packet. Hereinafter, description is provided on the assumption that the color M-FSK encoder 110 modulates a data stream which is a binary signal into a color code data signal.

According to an embodiment, the color M-FSK encoder 110 may perform line coding on a binary signal, so as to produce a binary data signal. Line coding may be modulation that outputs an input bit of 0 as 00, and outputs an input bit of 1 as 01.

A data stream may be a packet including a payload corresponding to data desired to be transmitted and a preamble corresponding to a header.

According to an embodiment, the signal transmission apparatus 100 may include a sequence number in a packet, and consecutive numbers may be assigned, as sequence numbers, to consecutive data packets, and predetermined numbers (bits) may be sequentially and repeatedly used as sequence numbers. For example, the sequence number of a first packet may be 00, the sequence number of a second packet may be 01, and the sequence number of a third packet may be 00 again. The signal reception apparatus 200 may determine whether packets are redundant based on the sequence numbers thereof.

With reference to FIG. 3, a part of the structure of a packet input to the color M-FSK encoder 110 according to an embodiment of the disclosure will be described. In another embodiment, the color M-FSK encoder 110 may convert input data into part of a packet as shown in FIG. 3, and may modulate the same.

Packets obtained by converting input data may include a plurality of data packets i−1, i, and i+1.

The plurality of data packets i−1, i, and i+1 may include a plurality of data sub-packets (e.g., the data packet i includes data sub-packets i1, i2, and i3), and each data sub-packet may include a payload including information bits corresponding to part of the input data.

According to an embodiment, in order to prevent packet loss due to a variable frame rate of a reception side camera, a plurality of data sub-packets included in a single data packet may include the same payload including the same information bits.

The rolling camera of the signal reception apparatus 200 may capture flickering of an LED light source continuously at different times a plurality of times, and may store each captured signal in a single column or row of an image sensor, so as to produce an image frame. In this instance, the frame rate of the camera may be variable or may be lower than a data packet transmission rate, depending on the settings of a device. Therefore, a signal transmission apparatus may configure a data packet to overlappingly include data sub-packets including the same payload in order to prevent loss of packet reception due to the limitation of the frame rate of the rolling camera. That is, the data sub-packets i1, i2, and i3 may include the same payload.

According to an embodiment, in order to enable the signal reception apparatus 200 to detect packet loss or to distinguish overlapping packets, the signal transmission apparatus 100 may assign a sequence number to each data packet or each data sub-packet, and consecutive numbers may be assigned, as sequence numbers, to consecutive data packets.

According to an embodiment, each data sub-packet i1, i2, and i3 may include the sequence number of the corresponding data packet i and the same payload which is information bits allocated to the corresponding data packet i.

According to an embodiment, a sequence number may be inserted into the front end of a packet, or according to another embodiment, sequence numbers may be inserted into both ends of a packet, that is, the front end and the rear end of the packet. FIG. 4 illustrates an embodiment in which a sequence number is inserted into the front end and the rear end of a packet. In the case in which the sequence numbers are inserted into the front end and the rear end of a packet, if the signal reception apparatus 200 detects a single preamble from a single captured image frame, the signal reception apparatus 200 may configure a packet according to forward decoding and backward decoding by taking into consideration a sequence number before and after the preamble.

According to an embodiment, a modulated packet or a data sub-packet may include a header part which is a preamble including meta information such as the size of a packet or the like.

According to another embodiment, the preamble is a bit code indicating the start of a packet (start frame (SF)), and may be a bit code known in advance to the signal transmission apparatus and the signal reception apparatus.

According to another embodiment, the signal transmission apparatus 100 may include a forward error correction (FEC) encoder and an asynchronous bits (Ab) bit insertor. The preamble may include an Ab bit.

The color M-FSK encoder 110 of the signal transmission apparatus 100 may separate, into three channels, at least part of a serial-type packet or a packet to which a preamble is inserted, and may modulate each according to the M-FSK scheme.

For example, if the bit code of the payload of a packet is as shown in FIG. 3, the signal transmission apparatus 100 may separate, based on every predetermined number of bits, the bit code of the payload '00 01 10' into three channels, that is, may separate the bit code as '00', '01', and '10', and may modulate each separated bit code according to the M-FSK scheme.

According to an embodiment, in the case of the preamble, M-FSK modulation may be performed for each channel. In this instance, color modulation is performed based on a pulse wave which is modulated from the preamble of the M-FSK modulated signal, without separating and inputting the preamble into respective channels. Only the bit-code of the payload may be separated and may be input to respective channels.

With reference to FIG. 4, a method in which the color M-FSK encoder 110 according to an embodiment of the disclosure modulates a bit code input for each channel according to a bit-frequency mapping table set in advance will be described.

The color M-FSK encoder 110 may map a bit code input for each channel and a frequency based on a table as shown in Table 1 below.

TABLE 1

| Packet of bits input | Frequency |
| --- | --- |
| Preamble 1 | F0 |
| Preamble 2 | F5 |
| 00 | F1 |
| 01 | F2 |
| 10 | F3 |
| 11 | F4 |

The band of each frequency mapped to a bit code may be as shown in FIG. 4.

According to an embodiment, a frequency f0 and f5 mapped to a preamble may be a frequency of the lowest band or a frequency of the highest band in the bit-frequency mapping table. In addition, the bit code of a payload may be frequencies f1, f2, f3, and f4 disposed at regular band intervals between the frequency of the lowest band and the frequency of the highest band in the bit-frequency mapping table, that is, between bands of frequencies mapped to the preambles. Although the frequencies mapped to the bit code of the payload are illustrated as four bands in FIG. 4, those skilled in the art would understand that frequencies mapped to the bit code of a payload may differ depending on the number of bit codes desired to be modulated and the band of a frequency f0 and f5 mapped to a preamble.

According to an embodiment, in the case of transmitting a color optical signal obtained by modulating data, the signal transmission apparatus 100 may transmit an optical signal of which the preamble is modulated first.

Therefore, the signal reception apparatus 200 may demodulate the preamble from the received optical signal so as to extract a corresponding frequency, and may determine the band of a frequency corresponding to the bit code of each payload. For example, the signal reception apparatus 200 may evenly divide the band between the frequencies f0 and f5 extracted from the demodulated preamble by a predetermined number, so as to determine the band of a frequency corresponding to the bit code of each payload.

That is, the signal transmission apparatus 100 may transmit a color modulated signal which is obtained by modulating an FSK modulated signal to which the frequency of the lowest band and the frequency of the highest band are mapped, and may transmit a color modulated signal modulated based on the payload, and thus, although the signal transmission apparatus 100 changes a frequency band in the bit-frequency mapping table and performs modulation according to an M-FSK scheme, the signal reception apparatus 200 may determine each frequency band in the bit-frequency mapping table without receiving a table separately.

Figure 5:
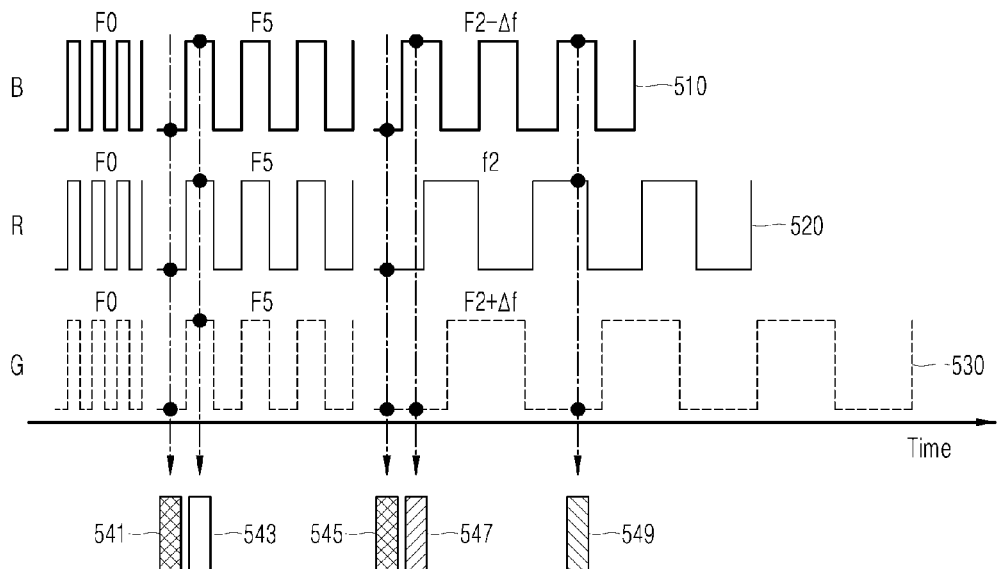
FIG. 5 is a diagram illustrating a method of producing a color modulated signal based on an M-FSK modulated signal according to an embodiment of the disclosure.

With reference to FIG. 5, a method in which the color M-FSK encoder 110 according to an embodiment of the disclosure modulates an FSK modulated signal 510, 520, and 530 input for each channel according to a bit-color mapping table set in advance will be described.

FIG. 5 describes a color modulator in the case in which an M-FSK encoder performs M-FSK modulation on a preamble for each channel. However, as described above, color modulation may be performed based on a pulse wave obtained by modulating the preamble in the M-FSK modulated signal, without separating and inputting the preamble into respective channels. In this instance, on the assumption that three pulse waves obtained by modulating the preamble are present equally, color modulation may be performed based on a bit-color mapping table set in advance.

The color modulator may produce the color modulated signal based on level signals at the same location in the time axis in the FSK modulated signals 510, 520, and 530 modulated at respective channels, and the FSK modulated signals 510, 520, and 530 may be in a pulse waveform.

For example, a color modulated signal 541 may be a color modulated signal (in the form of a control signal such as a voltage signal for controlling the color of a color LED) corresponding to a 'black' color produced based on a level signal of '000' at the same temporal location in the FSK modulated signals 510, 520, and 530 of respective channels according to the bit-color mapping table as shown in Table 2.

TABLE 2

| 3 bits Input | Detail | Color Output |
|---|---|---|
| 000 | 0xR + 0xG + 0xB | Black |
| 100 | 1xR + 0xG + 0xB | Red |
| 010 | 0xR + 1xG + 0xB | Green |
| 001 | 0xR + 0xG + 1xB | Blue |
| 110 | 1xR + 1xG + 0xB | Yellow |
| 101 | 1xR + 0xG + 1xB | Magenta |
| 011 | 0xR + 1xG + 1xB | Cyan |
| 111 | 1xR + 1xG + 1xB | White |

In the same manner, a color modulated signal 543 may be a color modulated signal corresponding to a 'white' color produced based on a level signal of '111' at the same temporal location in the FSK modulated signal 510, 520, and 530 of respective channels according to the bit-color mapping table, a color modulated signal 545 may be a color modulated signal corresponding to a 'white' color produced based on a level signal of '000' at the same temporal location in the FSK modulated signal 510, 520, and 530 of respective channels according to the bit-color mapping table, a color modulated signal 547 may be a color modulated signal corresponding to a 'red' color produced based on a level signal of '100' at the same temporal location in the FSK modulated signal 510, 520, and 530 of respective channels according to the bit-color mapping table, and a color modulated signal 549 may be a color modulated signal corresponding to a 'yellow' color produced based on a level signal of '110' at the same temporal location in the FSK modulated signal 510, 520, and 530 of respective channels according to the bit-color mapping table.

That is, the signal transmission apparatus 100 may convert level signals corresponding to the same location in the FSK modulated signals 510, 520, and 530 of respective channels into bits according to the magnitude of a signal, may produce a color modulated signal corresponding to a mapped color based on a bit code obtained by concatenating the converted bits and the bit-color mapping table.

The color of the bit-color mapping table may be a table that regards the bits of level signals as red, green, and blue, that is, may be a table that regards the channels that produce the FSK modulated signals 510, 520, and 530 as channels of the three primary colors.

The controller of the signal transmission apparatus 100 may control the color LED emission color of the light source part 130 based on a produced color modulated signal, so as to transmit the color modulated signal as a visible light signal.

When transmitting a color modulated signal, the signal transmission apparatus 100 may control a color LED so that all color LEDs included in the light source part 130 emit light in one color at the same time according to a color modulated signal.

Figure 6:
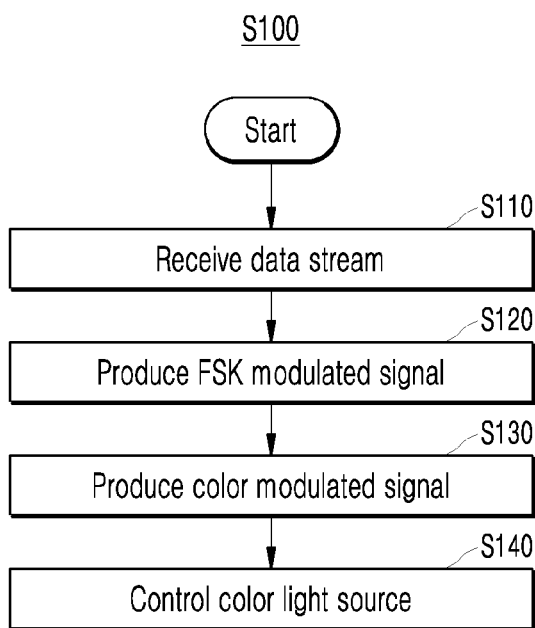
FIG. 6 is a flowchart illustrating a signal transmission method according to an embodiment of the disclosure.

With reference to FIG. 6, a signal transmission method of a signal transmission apparatus according to an embodiment of the disclosure will be described.

The signal transmission apparatus may receive a packet in a binary signal form, or may receive a transmission signal and may convert the transmission signal into a packet in a binary signal form, in operation S110.

The signal transmission apparatus may divide at least part of the packet by the predetermined number of bits, may input divided parts into a plurality of channels, and may produce FSK modulated signals based on bit codes input to the respective channels according to a bit-frequency mapping table set in advance in operation S120.

The signal transmission apparatus may produce a color modulated signal corresponding to a mapped color based on a bit-color mapping table set in advance and bit codes obtained by concatenating level signals of FSK modulated signals which are provided in a pulse waveform and produced from respective channels in operation S130.

The color modulated signal may be an electrical signal or command to control a color LED to emit light in a desired color, and the signal transmission apparatus may control a color LED according to the produced color modulated signal, so as to transmit a visible light signal in operation S140.

Figure 7:
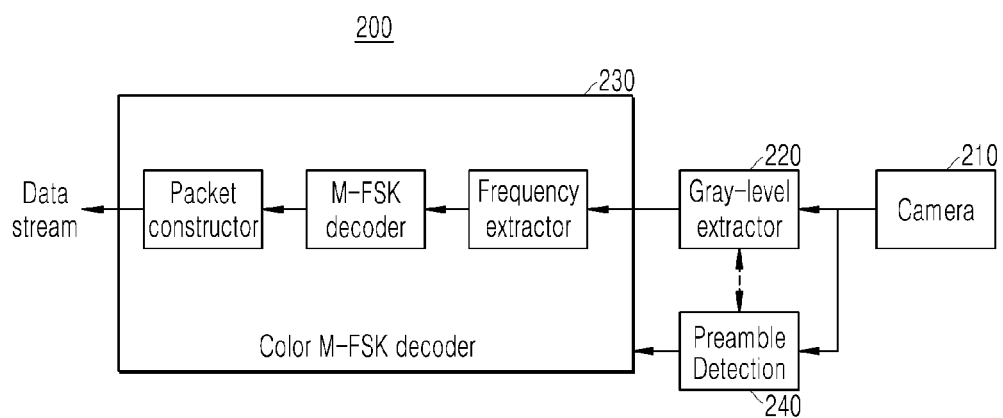
FIG. 7 is a block diagram illustrating the configuration of a signal reception apparatus according to an embodiment of the disclosure.

With reference to FIG. 7, the configuration of the signal reception apparatus 200 according to an embodiment of the disclosure will be described.

The signal reception apparatus 200 may include a rolling camera 210 which produces an image frame based on a signal that an image sensor obtains according to a rolling shutter scheme that receives an optical signal, a color separator (RGB separator) 220 which determines an area that includes a captured color LED in the image frame, produces a color code data signal based on the image of the corresponding area, and separates the color code data signal into color-based channel signals, a preamble detector 240 which separates a preamble from the color code data signal and determines the frequency of the preamble, and a color M-FSK decoder 230 which demodulates each color-based channel signal (a separated color code data signal of each channel) based on the frequency of the preamble and a bit-frequency mapping table according to an M-ary frequency shift keying (M-FSK) scheme, so as to produce a data stream.

Figure 8:
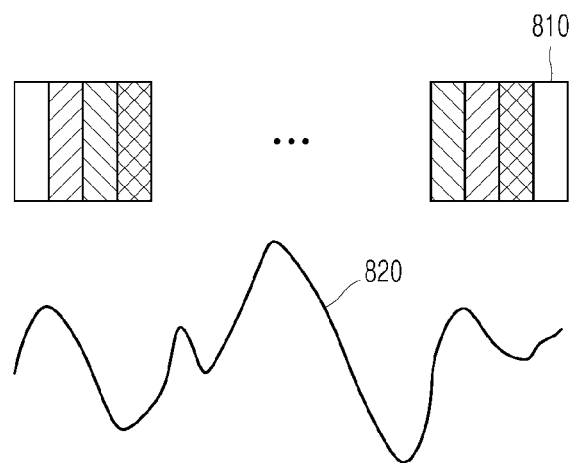
FIG. 8 is a diagram illustrating a method of demodulating a color modulated signal according to an embodiment of the disclosure.
Figure 9:
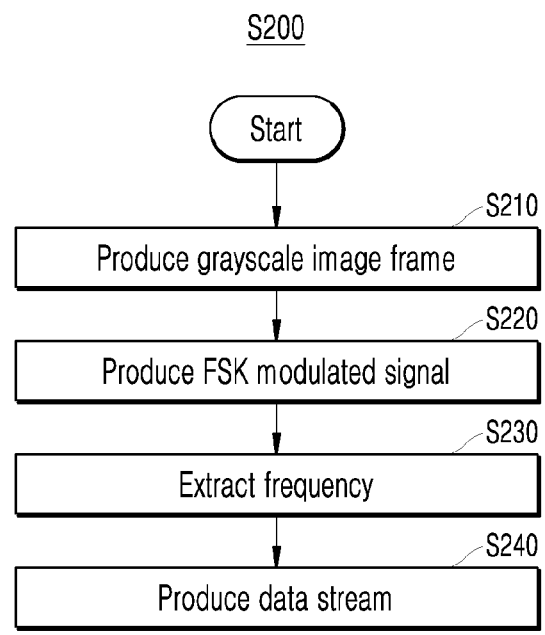
FIG. 9 is a flowchart illustrating a signal reception method according to an embodiment of the disclosure.

With reference to FIGS. 8 and 9, a signal reception method of the signal reception apparatus 200 according to an embodiment of the disclosure will be described.

A rolling camera may capture flickering of an LED light source continuously at different times a plurality of times, and may store each captured signal in a single column or row of an image sensor, so as to produce an image frame in operation S210. The rolling camera may sequentially expose each row or column of the image sensor, so as to obtain a signal value corresponding to the color of the LED light source according to the flickering of the LED light source in a column or row of the image sensor of the rolling camera.

The signal reception apparatus 200 may produce a color code data signal 827 obtained by converting the color 811, 813, 815, and 817 of an area including a captured color LED in the image frame into a bit code according to a bit-color mapping table set in advance, in operation S220.

The color separator 220 of the signal reception apparatus 200 may divide the color code data signal into three channels, and the color M-FSK decoder 230 may extract a frequency by performing Fourier transform on a separated color code data signal 821, 823, and 825 of each channel in operation S230.

For example, a frequency of f1 is extracted from the color code data signal 821, and a frequency of f2 is extracted from the color code data signal 823 and the color code data signal 825.

Based on a bit-frequency mapping table set in advance and a frequency extracted from a color code data signal 821, 823, and 825 of each channel, the color M-FSK decoder 230 may demodulate the color code data signal 821, 823, and 825 of each channel based on the frequency and a M-ary frequency shift keying (M-FSK) scheme, and may serialize the same, so as to produce a data stream. The data stream may be a packet which has been described above.

The bands of frequencies corresponding to the bit codes used for demodulation of a payload may be determined to be the bands of frequencies obtained by equally dividing, by a predetermined number, the band between two frequency bands of preambles detected by the preamble detector 240.

The color M-FSK decoder 230 may demodulate the color code data signal 821, 823, and 825 of each channel according to the M-FSK scheme using above-described Table 1, so as to determine a corresponding bit code.

With reference to FIGS. 10 to 18, communication between a signal transmission apparatus and a signal reception apparatus according to other embodiments of the disclosure will be described.

Figure 10:
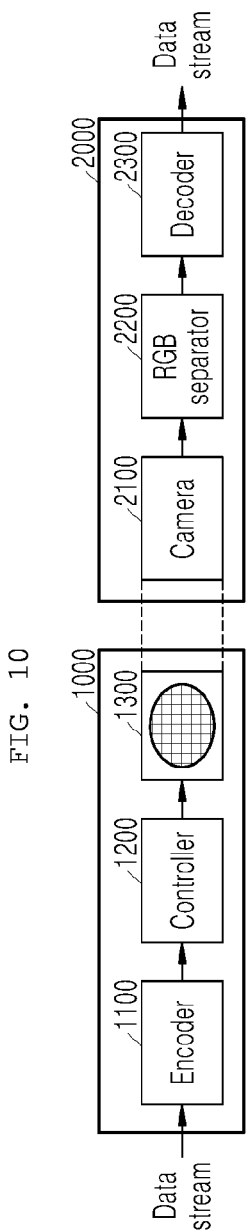
FIG. 10 is a diagram schematically illustrating communication between a signal transmission apparatus and a signal reception apparatus according to another embodiment of the disclosure.

With reference to FIG. 10, communication between a signal transmission apparatus and a signal reception apparatus according to another embodiment of the disclosure will be described.

Referring to FIG. 10, a signal transmission apparatus 1000 may be configured to transmit a transmission signal as a visible light signal via a light source part 1300 including a color LED, wherein the transmission signal is a signal obtained by receiving data, modulating the input data based on M-FSK, and modulating the modulated data to a color signal.

A signal reception apparatus 2000 may extract grayscale image information from a grayscale image produced based on a sensor signal of a camera 2100 which captures the light source part 1300 including a color LED using the camera 2100 (a rolling camera or a global camera) and may produce an FSK modulated signal in operation 2200, and an M-FSK decoder 2300 may extract a frequency from the FSK modulated signal and may demodulate the same according to M-FSK, so as to produce data.

In order to modulate the data according to M-FSK scheme, the signal transmission apparatus 1000 may separate the data into three channels and may modulate data for each channel according to M-FSK scheme.

The signal transmission apparatus 1000 may produce a color modulated signal based on a signal obtained by combining a plurality of FSK modulated signals which are respectively modulated in the three channels. This will be described in detail with reference to FIG. 14.

The signal transmission apparatus 1000 may control the light source part 1300 including a color LED so as to emit light according to a color modulated signal, so as to transmit the color modulated signal as a visual light signal.

The signal reception apparatus 2000 may produce an image frame by capturing the light source of the signal transmission apparatus 1000 including a color LED.

The signal reception apparatus 2000 may determine a light source area in the image frame, and may extract grayscale level information from the image frame of the light source area.

The signal reception apparatus 2000 may produce an FSK modulated signal based on the extracted grayscale level information, and perform Fourier transform on parts corresponding to the preamble and payload of the FSK modulated signal, so as to extract a frequency. The signal reception apparatus 2000 may demodulate the FSK modulated signal according to the M-FSK scheme based on the extracted frequency and the bit-frequency mapping table set in advance, and may produce a data stream.

Figure 11:
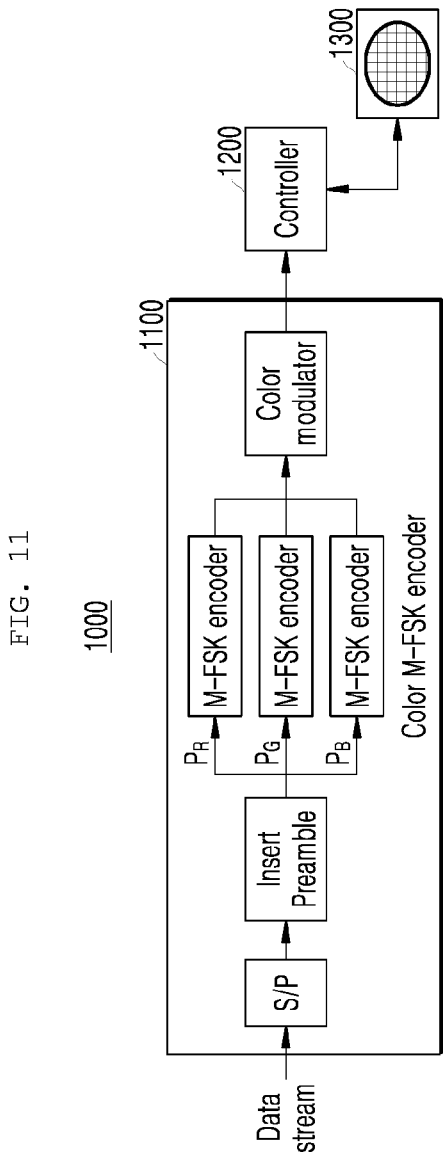
FIG. 11 is a block diagram illustrating the configuration of a signal transmission apparatus according to another embodiment of the disclosure.

With reference to FIG. 11, the configuration of a signal transmission apparatus according to another embodiment of the disclosure will be described.

Referring to FIG. 11, a signal transmission apparatus 1000 may include a color M-FSK encoder 1100, a serial to parallel (S2P) converter, a preamble inserter, a color M-FSK encoder 1100, a modulator 1100 including a color modulator, and a controller 1200 that controls the light source part 1300 which is a communication channel including an LED light source, and may include a clock generator that generates a clock signal.

According to another embodiment, a data stream may be a packet obtained by modulating a signal to be transmitted into a binary signal. The modulator may include a forward error correction (FEC) encoder, a preamble inserter, and a binary modulator that modulates input data into a binary signal.

According to another embodiment, the color M-FSK encoder 1100 may modulate, into a color code data signal, a data stream in which a binary signal is configured in the form of a packet. Hereinafter, description is provided on the assumption that the color M-FSK encoder 1100 modulates a data stream which is a binary signal into a code data signal.

According to another embodiment, the color M-FSK encoder 1100 may perform line coding on a binary signal, and may produce a binary data signal. Line coding may be modulation that outputs 00 based on an input bit of 0 and outputs 01 based on an input bit of 1.

The data stream may be a packet including a payload corresponding to data to be transmitted and a preamble corresponding to a header.

According to another embodiment, the signal transmission apparatus 1000 may include a sequence number in a packet, and consecutive numbers may be assigned as sequence numbers to consecutive data packets, and predetermined numbers (bits) may be sequentially and repeatedly used as sequence numbers. For example, the sequence number of a first packet may be 00, the sequence number of a second packet may be 01, and the sequence number of a third packet may be 00 again. The signal reception apparatus 2000 may determine whether packets are redundant based on the sequence numbers thereof.

Figure 12:
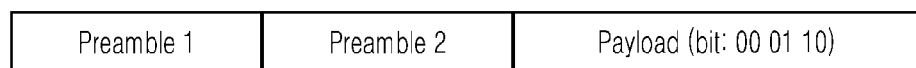
FIG. 12 is a diagram illustrating an embodiment of a packet of a data stream according to another embodiment of the disclosure.

With reference to FIG. 12, a part of the structure of a packet input to the color M-FSK encoder 1100 according to another embodiment of the disclosure will be described. In another embodiment, the color M-FSK encoder 1100 may convert input data into part of a packet as shown in FIG. 12, and may modulate the same.

Packets obtained by converting the input data may include a plurality of data packets i−1, i, and i+1.

Each of the plurality of data packets i−1, i, and i+1 may include a plurality of data sub-packets (e.g., the data packet i includes data sub-packets i1, i2, and i3), and each data sub-packet may include a payload including information bits corresponding to part of input data.

According to another embodiment, in order to prevent packet loss due to a variable frame rate of a reception side camera, a plurality of data sub-packets included in a single data packet may include the same payload including the same information bits. That is, the same payload may be redundantly transmitted to the signal reception apparatus 2000.

The rolling camera of the signal reception apparatus 2000 may capture flickering of an LED light source continuously at different times a plurality of times, and may store each captured signal in a single column or row of an image sensor, so as to produce an image frame. In this instance, the frame rate of the camera may be variable depending on the settings of a device or the like, or may be lower than a data packet transmission rate. Therefore, the signal transmission apparatus 1000 may configure a data packet to overlappingly include data sub-packets including the same payload in order to prevent omission of packet reception due to the limitation of the frame rate of the rolling camera. That is, the data sub-packets i1, i2, and i3 may include the same payload.

According to another embodiment, in order to enable the signal reception apparatus 2000 to detect packet loss or to distinguish overlapping packets, the signal transmission apparatus 1000 may assign a sequence number to each data packet or each data sub-packet, and consecutive numbers may be assigned, as sequence numbers, to consecutive data packets.

According to another embodiment, each data sub-packet i2, and i3 may include the sequence number of the corresponding data packet i and the same payload which is information bits allocated to the corresponding data packet i.

According to another embodiment, a sequence number may be inserted into the front end of a packet, or according to another embodiment, sequence numbers may be inserted into both ends of a packet, that is, the front end and the rear end of the packet. In the case in which sequence numbers are inserted into both ends of a packet, that is, the front end and the rear end of the packet, if the signal reception apparatus 2000 detects one preamble from a single captured image frame, the signal reception apparatus 2000 may configure a packet using forward decoding and backward decoding by taking into consideration sequence numbers before and after the preamble.

According to another embodiment, a modulated packet or a data sub-packet may include, in a preamble, a header part including meta information such as the size of a packet or the like.

According to another embodiment, a preamble is a bit code indicating the start of a packet (start frame (SF)), and may be a bit code known in advance to the signal transmission apparatus and the signal reception apparatus.

According to another embodiment, the signal transmission apparatus 1000 may include a forward error correction (FEC) encoder and an asynchronous bits (Ab) bit insertor. A preamble may include an Ab bit.

The color M-FSK encoder 1100 of the signal transmission apparatus 1000 may separate, into three channels, at least part of a serial-type packet or a packet to which a preamble is inserted, and may modulate each according to an M-FSK scheme.

For example, if the bit code of the payload of a packet is '00 01 10', the signal transmission apparatus 100 may separate the bit code of the payload, '00 01 10', into three channels based on every predetermined number of bits, that is, may separate the bit code into '00', '01', and '10', and may modulate each separated bit code according to the M-FSK scheme.

According to another embodiment, the preamble may perform M-FSK modulation for each channel, or may perform M-FSK modulation in one channel. If M-FSK modulation is performed in one channel, the preamble is not separated and is not input into respective channels, and color modulation is performed based on a pulse wave obtained by modulating the preamble in one channel, and only a bit code of the payload may be separated and may be input to respective channels.

Figure 13:
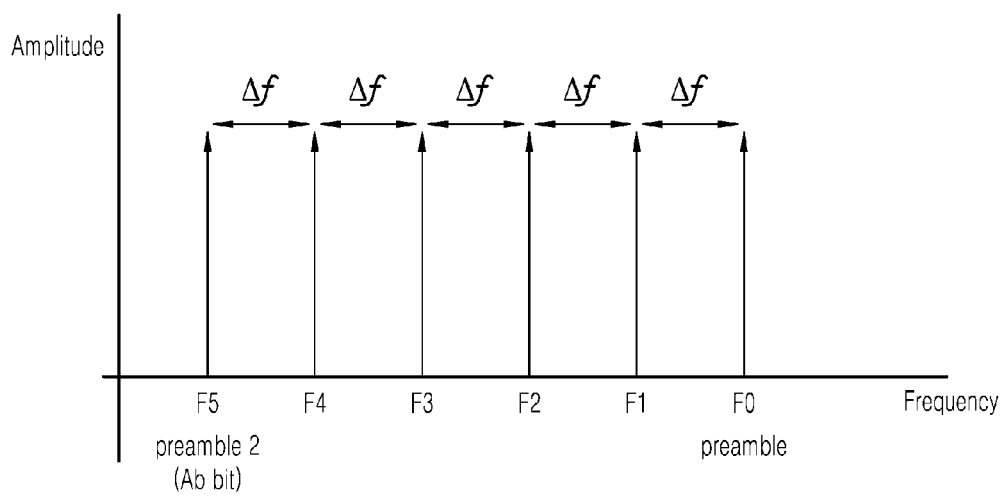
FIG. 13 is a diagram illustrating a frequency used for M-FSK modulation according to another embodiment of the disclosure.

With reference to FIG. 13, a method in which the color M-FSK encoder 1100 according to another embodiment of the disclosure modulates a bit code input for each channel according to a bit-frequency mapping table set in advance will be described.

The color M-FSK encoder 1100 may map a bit code input for each channel and a frequency based on a table as shown in Table 3 below.

TABLE 3

| Packet of bits input | Frequency for RED Channel | Frequency for Green Channel | Frequency for BLUE Channel |
|---|---|---|---|
| Preamble 1 | | F0 | |
| Preamble 2 | | F5 | |
| 00 | F1 | F1 + Δf | F1 − Δf |
| 01 | F2 | F2 + Δf | F2 − Δf |
| 10 | F3 | F3 + Δf | F3 − Δf |
| 11 | F4 | F4 + Δf | F4 − Δf |

Table 3 assumes that two preambles are mapped to the same frequencies in three channels. According to another embodiment, preambles may be mapped to different frequencies in respective channels in the same manner as different bit codes. Following embodiments will be described on the assumption that two preambles are mapped to the same frequencies in three channels.

The band of each frequency mapped to a bit code of a payload and a preamble may be as shown in FIG. 13A.

According to another embodiment, a frequency f0 and f5 mapped to a preamble may be a frequency of the lowest band or a frequency of the highest band in a bit-frequency mapping table. In addition, the bit-code of the payload may correspond to frequencies f1, f2, f3, and f4 (hereinafter referred to as basic frequencies) disposed at regular band intervals between the frequency of the lowest band and the frequency of the highest band in the bit-frequency mapping table, that is, between the frequencies mapped to preambles, or may correspond to frequencies which are a predetermined band apart from the basic frequencies f1, f2, f3, and f4 disposed at regular band intervals. Although basic frequencies f1, f2, f3, and f4 disposed at regular band intervals among frequencies mapped to the bit code of the payload are illustrated as four frequencies in FIG. 13, those skilled in the art would understand that the number of basic frequencies mapped to the bit code of a payload may be variable depending on the number of bit codes desired to be modulated and the band of a frequency f0 and f5 mapped to a preamble.

A frequency mapped to the bit code of a payload will be described in detail.

As identified from Table 3, although the bit codes of the payload are identical bit codes, if the bit codes are input into different channels, the bit codes may be mapped to different frequencies. For example, if a bit code of '00' is input to a red channel, the bit code may be mapped to a frequency 'F1'. If the bit code of '00' is input to a green channel, the bit code may be mapped to 'F1+Δf'. If the bit code of '00' is input to a blue channel, the bit code may be mapped to 'F1−Δf'. Here, the color for each channel may differ depending on the embodiment.

That is, as identified from a frequency band of FIG. 13B, the identical bit code of the payload may be mapped to a basic frequency in one channel, and the identical bit codes may be respectively mapped to frequencies of frequency bands which are the same distance apart from the band of the basic frequency in other two channels.

Accordingly, even in the case in which an identical bit code is repeated in the payload (e.g., the case in which a bit code of '01 01 01' of a payload is separated and respectively input into three channels, and bit-frequency mapping is performed thereon, as described in FIG. 12), the identical bit codes input to respective channels may be mapped to frequencies of different frequency bands, respectively, and thus, the signal reception apparatus 2000 may identify whether the identical bit code is repeated when decoding the same. Particularly, if the signal reception apparatus 2000 performs demodulation based on a grayscale image according to an M-FSK scheme, a manner that performs separation into color channels based on color information and performs demodulation may not be allowed. Therefore, if the signal transmission apparatus 1000 maps an identical bit code to the same frequency for each channel, the signal reception apparatus 2000 may be incapable of identifying whether an identical bit code is repeated or a part of a packet is lost, which is a drawback. Therefore, in the case in which identical bit codes of the payload are mapped to frequencies of different bands in respective channels, even though the signal reception apparatus 2000 performs demodulation based on a grayscale image according to the M-FSK scheme, a packet may be safely demodulated, which is advantageous.

According to another embodiment, when transmitting a color optical signal obtained by modulating data, the signal transmission apparatus 1000 may transmit an optical signal obtained by modulating a preamble first.

Therefore, the signal reception apparatus 2000 may demodulate the preamble from the received optical signal so as to extract a corresponding frequency, and may determine the band of a basic frequency corresponding to the bit code of each payload. For example, the signal reception apparatus 2000 may evenly divide, by a predetermined number, the band between the frequencies f0 and f5 extracted via demodulation of a preamble, so as to determine the band of a basic frequency corresponding to the bit code of each payload.

That is, the signal transmission apparatus 1000 may transmit a color modulated signal which is obtained by modulating an FSK modulated signal to which the frequency of the lowest band and the frequency of the highest band are mapped, and may transmit a color modulated signal modulated based on the payload, and thus, although the signal transmission apparatus 1000 changes a frequency band in the bit-frequency mapping table and performs modulation according to the M-FSK scheme, the signal reception apparatus 2000 may determine each frequency band in the bit-frequency mapping table without receiving a table separately.

The signal reception apparatus 2000 may determine a basic frequency band, and may determine frequencies of bands a predetermined frequency band Δf apart from respective basic frequencies, as frequencies of other channels.

Figure 14:
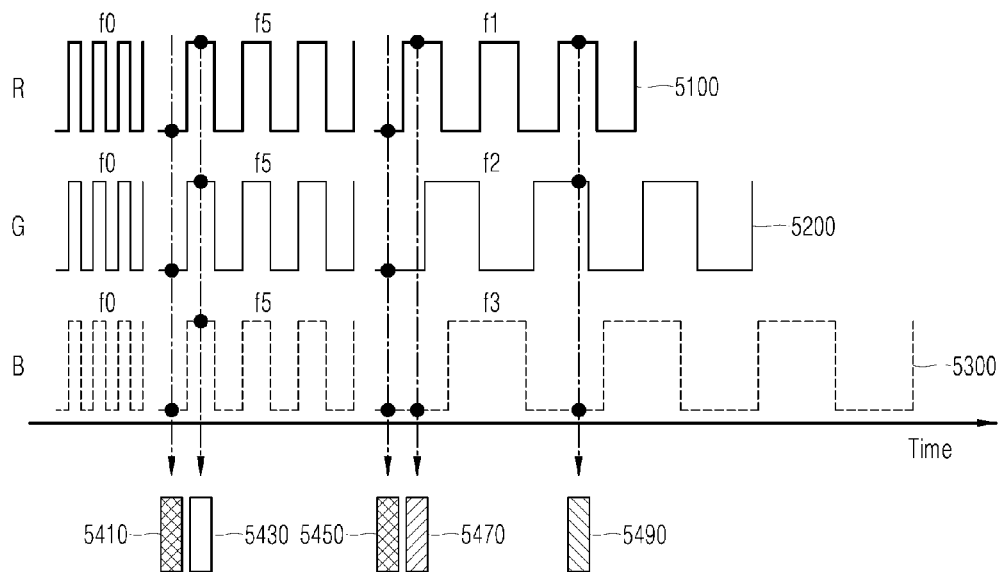
FIG. 14 is a diagram illustrating a method of producing a color modulated signal based on an M-FSK modulated signal according to another embodiment of the disclosure.

With reference to FIG. 14, a method in which the color M-FSK encoder 1100 according to another embodiment of the disclosure modulates FSK modulated signals 5100, 5200, and 5300 input into respective channels according to a bit-color mapping table set in advance will be described.

FIG. 14 describes a color modulator in the case in which an M-FSK encoder performs M-FSK modulation on a preamble for each channel. However, as described above, color modulation may be performed based on a pulse wave obtained by modulating the preamble in one channel, without separating and inputting the preamble into respective channels. In this instance, on the assumption that three pulse waves obtained by modulating the preamble are present equally, color modulation may be performed based on a bit-color mapping table set in advance.

FIG. 14 illustrates that identical bit codes of the payload are input to respective channels. That is, it is illustrated that bit-frequency mapping is performed by separating the bit code of '01 01 01' of the payload as shown in FIG. 12 and respectively inputting the same to three channels.

A color modulator may produce a color modulated signal based on level signals at the same location in the time axis in FSK modulated signals 5100, 5200, and 5300 modulated at respective channels, and the FSK modulated signals 5100, 5200, and 5300 may be in a pulse waveform.

For example, a color modulated signal 5410 may be a color modulated signal (in the form of a control signal such as a voltage signal for controlling the color of a color LED) corresponding to a 'black' color produced based on '000' corresponding a level signal at the same temporal location in the FSK modulated signals 5100, 5200, and 5300 of respective channels according to a bit-color mapping table as shown in Table 4.

TABLE 4

| 3 bits Input | Detail | Color Output |
| --- | --- | --- |
| 000 | 0xR + 0xG + 0xB | Black |
| 100 | 1xR + 0xG + 0xB | Red |
| 010 | 0xR + 1xG + 0xB | Green |
| 001 | 0xR + 0xG + 1xB | Blue |
| 110 | 1xR + 1xG + 0xB | Yellow |
| 101 | 1xR + 0xG + 1xB | Magenta |
| 011 | 0xR + 1xG + 1xB | Cyan |
| 111 | 1xR + 1xG + 1xB | White |

In the same manner, a color modulated signal 5430 may be a color modulated signal corresponding to a 'white' color produced based on '111' corresponding to a level signal at the same temporal location in the FSK modulated signals 5100, 5200, and 5300 of respective channels according to the bit-color mapping table, a color modulated signal 5450 may be a color modulated signal corresponding to a 'white' color produced based on '000' corresponding to a level signal at the same temporal location in the FSK modulated signals 5100, 5200, and 5300 of respective channels according to the bit-color mapping table, a color modulated signal 5470 may be a color modulated signal corresponding to a 'blue' color produced based on '001' corresponding to a level signal at the same temporal location in the FSK modulated signals 5100, 5200, and 5300 of respective channels according to the bit-color mapping table, and a color modulated signal 5490 may be a color modulated signal corresponding to a 'dark red (magenta)' color produced based on '101 corresponding to a level signal at the same temporal location in the FSK modulated signals 5100, 5200, and 5300 of respective channels according to the bit-color mapping table.

That is, the signal transmission apparatus 1000 may convert level signals corresponding to the same location in the FSK modulated signals 5100, 5200, and 5300 of respective channels into bits according to the magnitude of a signal, and may produce a color modulated signal corresponding to a mapped color based on a bit code obtained by concatenating the converted bits and the bit-color mapping table.

The color of the bit-color mapping table may be a table that regards the bits of the level signals as red, green, and blue, that is, may be a table that regards the channels that produce the FSK modulated signals 5100, 5200, and 5300 as channels of the three primary colors.

The controller of the signal transmission apparatus 1000 may control the color LED emission color of the light source part 1300 based on a produced color modulated signal, so as to transmit the color modulated signal as a visible light signal.

When transmitting a color modulated signal, the signal transmission apparatus 1000 may control a color LED so that all color LEDs included in the light source part 1300 emit light in one color at the same time according to a color modulated signal.

Figure 15:
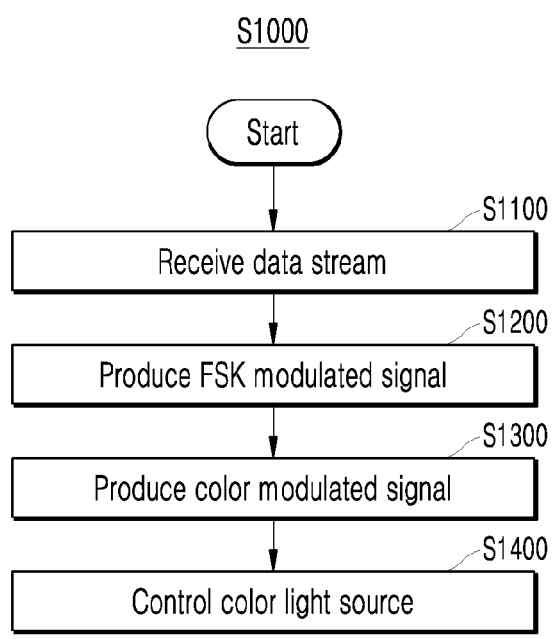
FIG. 15 is a flowchart illustrating a signal transmission method according to another embodiment of the disclosure.

With reference to FIG. 15, a signal transmission method of a signal transmission apparatus according to another embodiment of the disclosure will be described.

The signal transmission apparatus may receive a packet in a binary signal form, or may receive a transmission signal and may convert the transmission signal into a packet in a binary signal form, in operation S1100.

The signal transmission apparatus may divide at least part of the packet on the predetermined number of bits, may input divided parts into a plurality of channels, may produce FSK modulated signals based on the bit codes input into respective channels according to a bit-frequency mapping table set in advance in operation S12000. In this instance, a frequency mapped to a bit code for each channel may be as shown in Table 3.

The signal transmission apparatus may produce a color modulated signal corresponding to a mapped color based on a bit-color mapping table set in advance and bit codes obtained by concatenating level signals of FSK modulated signals which are provided in a pulse waveform and produced from respective channels in operation S1300.

The color modulated signal may be an electrical signal or command to control a color LED to emit light in a desired color, and the signal transmission apparatus may control a color LED according to the produced color modulated signal, so as to transmit a visible light signal in operation S140.

Figure 16:
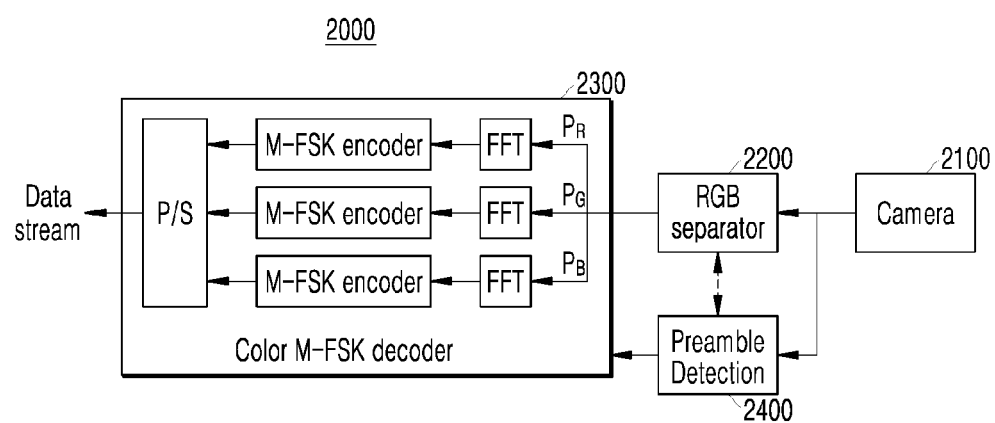
FIG. 16 is a block diagram illustrating the configuration of a signal reception apparatus according to another embodiment of the disclosure.

With reference to FIG. 16, the configuration of the signal reception apparatus 2000 according to another embodiment of the disclosure will be described.

The signal reception apparatus 2000 may include a rolling camera 2100 which produces an image frame based on a signal obtained by an image sensor according to a rolling-shutter scheme that receive an optical signal, a grayscale information extractor 2200 which determines an area including a captured color LED in the image frame, and extracts grayscale information based on the image of the corresponding area, so as to produce an FSK modulated signal, a preamble detector 240 which separates a preamble from the grayscale level information and determines the frequency of the preamble, and a color M-FSK decoder 2300 which demodulates the FSK modulated signal based on the frequency of the preamble and a bit-frequency mapping table according to M-ary frequency shift keying (M-FSK) scheme.

Figure 17:
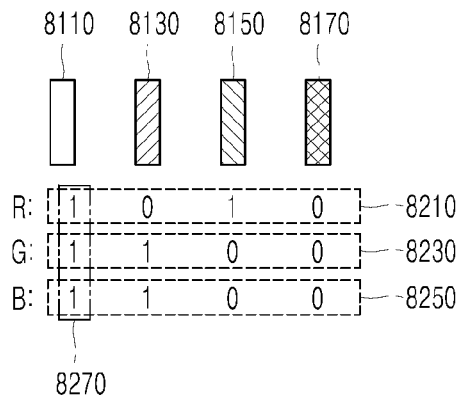
FIG. 17 is a diagram illustrating a method of demodulating a received optical signal according to another embodiment of the disclosure.
Figure 18:
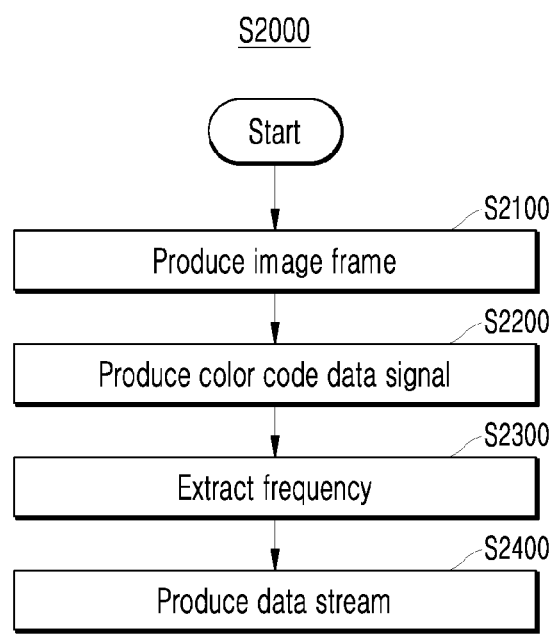
FIG. 18 is a flowchart illustrating a signal reception method according to another embodiment of the disclosure.

With reference to FIGS. 17 and 18, a signal reception method of the signal reception apparatus 2000 according to another embodiment of the disclosure will be described.

A rolling camera may capture flickering of an LED light source continuously at different times a plurality of times, and may store each captured signal in a single column or row of an image sensor, so as to produce an image frame in operation S2100. The rolling camera may sequentially expose each row or column of the image sensor, so as to obtain a signal value corresponding to the color of the LED light source according to the flickering of the LED light source in a column or row of the image sensor of the rolling camera. The rolling camera may be a color camera or a monochrome camera that produces a grayscale image.

The signal reception apparatus 2000 may produce a grayscale image frame based on a signal of a sensor that captures a color LED in operation S2100. In the case of a color camera, from a color image, a grayscale image may be produced based on information associated with each color-based channel (various conventional methods that produce a grayscale image from a color image may be used). In the case of a monochrome camera, signals capable of configuring a grayscale image may be directly output from a camera sensor.

The rolling camera may capture flickering of an LED light source continuously at different times a plurality of times, and may store each captured signal in a single column or row of an image sensor, so as to produce an image frame. The rolling camera may sequentially expose each row or column of the image sensor, so as to obtain a signal value corresponding to the color or the brightness of the LED light source according to the flickering of the LED light source in a column or row of the image sensor of the rolling camera. The rolling camera may produce a plurality of image frames. In the following description, it is assumed that the rolling camera sequentially exposes each row of the image sensor.

The signal reception apparatus 2000 may extract grayscale level information 8100 from an area including the captured color LED. The grayscale level information may be grayscale intensity values extracted from each row or column of the area including the captured color LED. The signal reception apparatus 2000 may produce an FSK modulated signal based on the grayscale level information in operation S2200.

The signal reception apparatus 2000 may separate a signal corresponding to a preamble from the grayscale level information or the grayscale image frame, may convert the signal to a form based on the frequency domain, may extract a frequency, and may determine the bands of frequencies corresponding to the preamble.

The signal reception apparatus 2000 may determine the bands of basic frequencies by evenly dividing, by the predetermined number, the band of frequencies corresponding to respective bit codes used for demodulation of the payload, that is, a band between two frequency bands of detected preambles.

The signal reception apparatus 2000 may convert an FSK modulated signal 8100 into a form based on the frequency domain according to Fourier fast transform (FFT) or the like, and may extract a frequency in operation S2300.

The signal reception apparatus 2000 may demodulate the FSK modulated signal 8100 based on a bit-frequency mapping table set in advance and the extracted frequency, according to an M-ary frequency shift keying (M-FSK)

scheme, and may configure the payload of a packet, so as to produce a data stream. The data stream may be a packet which has been described above.

The color M-FSK decoder 2300 may demodulate the FSK modulated signal 8100 using above-described Table 3 according to the M-FSK scheme, and may determine a corresponding bit code. As described above, the frequencies of different frequency bands (e.g., basic frequencies and bands which are a predetermined band Δf apart from the basic frequencies) may be mapped to an identical bit code.

Therefore, in the case of demodulating a color M-FSK signal based on a grayscale image, if a monochrome camera and a single frequency converting module are used, a color M-FSK signal may be easily demodulated at relatively low cost.

The above-described disclosure may be implemented by computer readable codes in a medium in which a program is recorded. A computer readable medium may include all types of recording devices that store data which are readable by a computer system. Examples of the computer readable medium may include hard disk drive (HDD), solid state disk (SSD), silicon disk drive (SDD), ROM, RAM, CD-ROM, a magnetic tape, a floppy disk, an optical data storage device, and the like. In addition, the computer may include a processor of each device.

The program may be designed and configured specially for the disclosure, or may be publicly known to those skilled in the computer software field. Examples of a program may include high class language codes which can be executed in a computer by using an interpreter, as well as machine codes made by a compiler.

In the specification (particularly claims) of the disclosure, the term "the" and demonstrative terms which are similar thereto may correspond to both singularity and plurality. In addition, if the disclosure specifies a range, the disclosure includes an invention to which individual values falling within the range are applied (unless otherwise noted), and it is construed that the detailed description of the disclosure specifies individual values included in the range.

The operations of the method according to the disclosure may be implemented in appropriate order unless the order of the operations is explicitly state or otherwise mentioned. The disclosure is not necessarily limited to the order of operations stated herein. The use of all examples or terms (e.g., or the like) in the disclosure is merely to describe the disclosure in detail, and the scope of the disclosure is only limited by claims but not limited to the examples or terms. In addition, those skilled in the art will understand that the various modifications, combinations, and changes may be made based on design conditions and factors within the scope of claims or equivalents thereof.

Therefore, the idea of the disclosure is not limited to the above-described embodiments, and the range of idea of the disclosure may include the scope of claims described below and the scope of equivalents and modifications equivalently modified therefrom.

What is claimed is:

1. An optical signal transmission method in which a processor performs at least part of each operation, the method comprising:
   receiving a data stream;
   separating at least part of the data stream into three channels, and modulating the separated data streams according to an M-ary frequency shift keying (M-FSK) scheme so as to produce FSK modulated signals;
   combining a plurality of FSK modulated signals which are modulated respectively in the three channels, and producing a color modulated signal based on a predetermined bit-color mapping table set in advance; and
   transmitting the color modulated signal by controlling a light source of an identical optical channel based on the color modulated signal,
   wherein the producing of the color modulated signal comprises:
   producing the color modulated signal based on level signals at an identical location in a time axis in the plurality of FSK modulated signals provided in a pulse waveform; and
   converting the level signals into bits, and concatenating the converted bits so as to produce the color modulated signal.

2. The method of claim 1, and further comprising:
   modulating a separated data stream based on a bit-frequency mapping table set in advance, and
   mapping, to a preamble of the data stream, a frequency of a lowest band or a frequency of a highest band in the bit-frequency mapping table, so as to produce the FSK modulated signal.

3. The method of claim 2, further comprising:
   producing the FSK modulated signal by mapping, to a payload of the data stream, frequencies disposed at regular band intervals between the frequency of the lowest band and the frequency of the highest band in the bit-frequency mapping table.

4. The method of claim 1, and further comprising producing the FSK modulated signal by mapping, to identical bit codes, frequencies different for respective channels.

5. The method of claim 4, wherein the producing of the FSK modulated signal further comprises modulating the separated data streams based on a bit-frequency mapping table set in advance, and wherein a frequency mapped, for each channel of the bit-frequency mapping table, to any one bit code of a payload of the data stream belongs to one of a first frequency band, a second frequency band, and a third frequency band, and the second frequency band and the third frequency band are frequency bands which are an identical distance apart from the first frequency band.

6. An optical signal transmission method in which a processor performs at least part of each operation, the method comprising:
   receiving a data stream;
   separating at least part of the data stream into three channels,
   modulating the separated data streams according to an M-ary frequency shift keying (M-FSK) scheme so as to produce FSK modulated signals;
   combining a plurality of FSK modulated signals which are modulated respectively in the three channels,
   producing a color modulated signal based on a predetermined bit-color mapping table set in advance; and
   transmitting the color modulated signal by controlling a light source of an identical optical channel based on the color modulated signal,
   wherein the producing of the FSK modulated signal further comprises:
   modulating a separated data stream based on a bit-frequency mapping table set in advance, and mapping, to a preamble of the data stream, a frequency of a lowest band or a frequency of a highest band in the bit-frequency mapping table, so as to produce the FSK modulated signal, and
   wherein the transmitting of the color modulated signal further comprises transmitting a color modulated signal which is modulated from the FSK modulated signal to which the frequency of the lowest band and the frequency of the highest band in the bit-frequency mapping table are mapped, and transmitting a color modulated signal modulated based on a payload of the data stream.

7. An optical signal transmission apparatus, the apparatus comprising:
a light source part including a color LED;
a modulator configured to modulate an input signal; and
a controller configured to transmit a modulated transmission signal by controlling the light source part, wherein the modulator is configured to receive a data stream, to separate at least part of the data stream into three channels, to respectively modulate the separated data streams according to an M-ary frequency shift keying (MFSK) scheme so as to produce a plurality of FSK modulated signals, to combine the plurality of FSK modulated signals which are modulated respectively in the three channels, and to produce a color modulated signal based on a bit-color mapping table set in advance, and wherein the controller transmits the color modulated signal to a single identical channel by controlling the light source part,
wherein the modulator is further configured to produce the color modulated signal based on level signals at an identical location in a time axis in the plurality of FSK modulated signals provided in a pulse waveform, to convert the level signals into bits, and to concatenate the converted bits, so as to produce the color modulated signal.

8. The apparatus of claim 7, wherein the modulator is further configured to modulate the separated data stream based on a bit-frequency mapping table set in advance, and to map, to a preamble of the data stream, a frequency of a lowest band or a frequency of a highest band in the bit-frequency mapping table, so as to produce the plurality of FSK modulated signals.

9. The apparatus of claim 8, wherein the modulator is further configured to produce the FSK modulated signal by mapping a payload of the data stream to frequencies disposed at regular band intervals between the frequency of the lowest band and the frequency of the highest band in the bit-frequency mapping table.

10. The apparatus of claim 7, wherein the modulator is further configured to produce the FSK modulated signals by mapping, to identical bit codes, frequencies different for respective channels.

11. The apparatus of claim 10, wherein the modulator is further configured to modulate the separated data streams based on a bit-frequency mapping table set in advance, and wherein a frequency mapped, for each channel of the bit-frequency mapping table, to any one bit code of a payload of the data stream belongs to one of a first frequency band, a second frequency band, and a third frequency band, and the second frequency band and the third frequency band are frequency bands which are an identical distance apart from the first frequency band.

12. An optical signal transmission apparatus, the apparatus comprising:
a light source part including a color LED;
a modulator configured to modulate an input signal; and
a controller configured to transmit a modulated transmission signal by controlling the light source part,
wherein the modulator is configured to receive a data stream, to separate at least part of the data stream into three channels, to respectively modulate the separated data streams according to an M-ary frequency shift keying (MFSK) scheme so as to produce FSK modulated signals, to combine the plurality of FSK modulated signals which are modulated respectively in the three channels, and to produce a color modulated signal based on a bit-color mapping table set in advance,
wherein the controller transmits the color modulated signal to a single identical channel by controlling the light source part, wherein the modulator is further configured to modulate the separated data stream based on a bit-frequency mapping table set in advance, and to map, to a preamble of the data stream, a frequency of a lowest band or a frequency of a highest band in the bit frequency mapping table, so as to produce the FSK modulated signal, and
wherein the controller is further configured to transmit a color modulated signal which is modulated from the FSK modulated signal to which the frequency of the lowest band and the frequency of the highest band in the bit-frequency mapping table are mapped, and to transmit a color modulated signal which is modulated based on a payload of the data stream.

* * * * *